United States Patent [19]
Goeke

[11] 3,712,104
[45] Jan. 23, 1973

[54] APPARATUS FOR CLAMPING WORKPIECES IN DRAW BENCHES FOR THE LIKE

[75] Inventor: Alfons Goeke, Solingen, Germany

[73] Assignee: Th. Kieserling & Albrecht, Solingen, Germany

[22] Filed: Dec. 31, 1970

[21] Appl. No.: 103,135

[30] Foreign Application Priority Data

Jan. 22, 1970    Germany......................P 20 02 709.2

[52] U.S. Cl..................................72/290, 72/422
[51] Int. Cl. ...........................B21c 1/14, B21d 43/10
[58] Field of Search........72/290, 422, 274, 284, 287, 72/305, 311; 269/138, 234; 24/263 R, 263 HW

[56] References Cited

UNITED STATES PATENTS

| 2,597,499 | 2/1972 | Kerr | 72/290 |
| 3,065,781 | 11/1962 | Muller | 72/305 |
| 3,234,773 | 2/1966 | Bath | 72/305 |
| 3,087,604 | 4/1963 | Coan | 72/290 |
| 1,911,157 | 5/1933 | Leech | 72/290 |

FOREIGN PATENTS OR APPLICATIONS

| S45243 | 6/1966 | Germany | 72/422 |

Primary Examiner—Charles W. Lanham
Assistant Examiner—Michael J. Keenan
Attorney—Michael S. Striker

[57] ABSTRACT

Apparatus which clamps one or more tubular or solid rod-shaped workpieces during forcible introduction of leading ends of such workpieces into the dies of a draw bench is mounted in a carriage which is reciprocable in the frame of the draw bench toward and away from the dies. The apparatus has pairs of wedge-like adjusting members which support wedge-like holders for work-engaging clamping elements and are movable along inclined internal guide surfaces of the carriage in response to rotation of feed screws. The inclination of guide surfaces with reference to the direction of reciprocation of the carriage exceeds the self-locking angle and the inclination of guide faces provided on the adjusting members for the holders is below the self-locking angle. A piston is employed to block the movement of one of each pair of adjusting members with reference to the carriage while the carriage performs a working stroke and while the clamping elements hold a workpiece behind the leading end which is to be forced through the die.

10 Claims, 3 Drawing Figures

INVENTOR
ALFONS GOEKE

APPARATUS FOR CLAMPING WORKPIECES IN DRAW BENCHES FOR THE LIKE

BACKGROUND OF THE INVENTION

The present invention relates to apparatus for clamping workpieces, particularly metallic tubes, bars or rods, in work benches or like machines. More particularly, the invention relates to improvements in clamping apparatus for workpieces in machines of the type wherein one or more workpieces are firmly gripped by jaws or analogous clamping elements during lengthwise transport of the leading ends of workpieces toward and through the openings of dies or analogous shaping devices through which the workpieces are thereupon drawn with attendant reduction in diameter and simultaneous elongation.

It is already known to engage a tubular or rod-like workpiece by a pair of clamping elements which are provided on wedge-like holders. Such holders are mounted on wedge-like adjusting members which are supported by a reciprocable carriage of a draw bench. The adjusting members are movable with reference to the carriage in the longitudinal direction of a workpiece which is to be held by the clamping elements. The outer surfaces of the adjusting members are slidable along complementary guide surfaces provided on the carriage and making with the axis of a clamped workpiece an angle exceeding the angle which is necessary to produce between such surfaces a self-locking action. The holders are slidable along internal guide faces of the adjusting members and the inclination of such internal guide faces with reference to the axis of a clamped workpiece is less than the self-locking angle.

When a tubular or a solid rod-like workpiece is to be treated in a draw bench, it is caused to pass through the opening of a die by resorting to so-called pinchers which engage the leading end of the workpiece and pull it through the die or by employing a carriage wherein the workpiece is claimed while the carriage advances in a direction to forcibly move the leading end of the workpiece through the die so that the leading end can be engaged by the customary drawing carriage which thereupon pulls the remaining major part of the workpiece through the die. Presently known carriages which serve to push the leading ends of workpieces through the openings of dies are normally provided with sets of rollers for wedge-like adjusting members which carry the holders for the work-engaging clamping elements. The rollers are interposed between the housing of the carriage and the adjusting members. Such types of clamping apparatus are satisfactory if the clamping elements for the workpieces are relatively long so that they can properly grip the workpiece during transport toward the die. Long clamping elements are further necessary on the ground that the adjusting members must be mounted on a substantial number of rollers to insure that the rollers can withstand the clamping forces which arise during movement of the leading end of a workpiece through the die. If the carriage is to transport workpieces of greater or smaller diameter, the adjusting members support wedge-like carriers which are movable radially of the workpiece and carry the clamping elements.

It is also known to provide a machine for testing of metallic tubes with segmental clamping elements which carry sealing heads and are mounted in the housing of the testing machine by means of wedges having external surfaces whose inclination suffices to produce a self-locking action and inner faces whose inclination is less than necessary to produce a self-locking action. Such segmental clamping elements are not suited for use in draw benches of the type wherein a carriage propels the leading ends of workpieces through the dies.

SUMMARY OF THE INVENTION

An object of the invention is to provide a draw bench or an analogous machine for reducing the diameters of tubular or solid rod-shaped metallic workpieces with a novel and improved clamping apparatus which is capable of gripping one or more workpieces with a force strong enough to prevent slippage during forcible introduction of the leading ends of workpieces into and through the dies and which can employ relatively short clamping elements.

Another object of the invention is to provide a clamping apparatus whose clamping elements can be rapidly disengaged from workpieces when the carriage wherein the apparatus is mounted is to perform a return stroke.

A further object of the invention is to provide novel means for preventing undesirable movements of wedge-like adjusting elements in clamping apparatus for use in draw benches or the like.

An additional object of the invention is to provide a clamping apparatus which can be installed in presently known draw benches or like machines.

Still another object of the invention is to provide the carriage of a draw bench with a clamping apparatus which occupies little room, as considered in the direction of movement of the carriage, and is capable of gripping one or more workpieces with a force which is invariably sufficient to prevent slippage of the carriage with reference to the workpieces while the carriage is caused to move toward one or more dies.

The invention is embodied in a clamping apparatus adapted to be used in a machine for moving elongated workpieces lengthwise along a predetermined path, particularly in a draw bench. The machine comprises a carriage which is reciprocable in and counter to a predetermined direction whereby it respectively moves toward and away from one or more dies, and the clamping apparatus comprises at least one pair of wedge-like adjusting members mounted in the carriage at the opposite sides of the path for workpieces and being movable with reference to the carriage in and counter to the predetermined direction, internal guide surfaces provided on the carriage and sloping toward the path for the workpieces counter to the predetermined direction, complementary surfaces provided on the adjusting members for sliding movement along the internal guide surfaces, adjustable abutment means provided in the carriage for at least one of the adjusting members and extending into the path of movement of the one adjusting member in the predetermined direction with reference to the carriage, and retaining means for holding the abutment means with a variable force in a predetermined position with reference to the carriage. The inclination of the surfaces on the carriage and on the adjusting members with reference to the path of movement of the workpieces exceeds the self-locking angle.

Each of the adjusting members carries a reciprocable wedge-like holder for a clamping element which engages with or is disengaged from a workpiece in response to movement of the holder with reference to the respective adjusting member. The adjusting members have guide faces along which the holders can slide and whose inclination with reference to the path of the workpieces is less than the self-locking angle. The holders are reciprocable by hydraulic double-acting cylinders and the aforementioned retaining means for the abutment means preferably includes a single-acting cylinder and a one-way valve which opens to permit escape of hydraulic fluid from the single-acting cylinder in response to actuation of the double-acting cylinders for the purpose of moving the clamping elements away from the workpieces upon completion of the forward movement of the carriage. Such opening of the one-way valve results in unlocking of the one adjusting member and enables the double-acting cylinders to disengage the clamping elements from the workpieces preparatory to return movement of the carriage to its starting position.

The novel features which are considered as characteristic of the invention are set forth in particular in the appended claims. The improved clamping apparatus, itself, however, both as to its construction and its mode of operation, together with additional features and advantages thereof, will be best understood upon persual of the following detailed description of certain specific embodiments with reference co the accompanying drawing.

DESCRIPTION OF THE PREFERRED EMBODIMENTS

Figure 1:
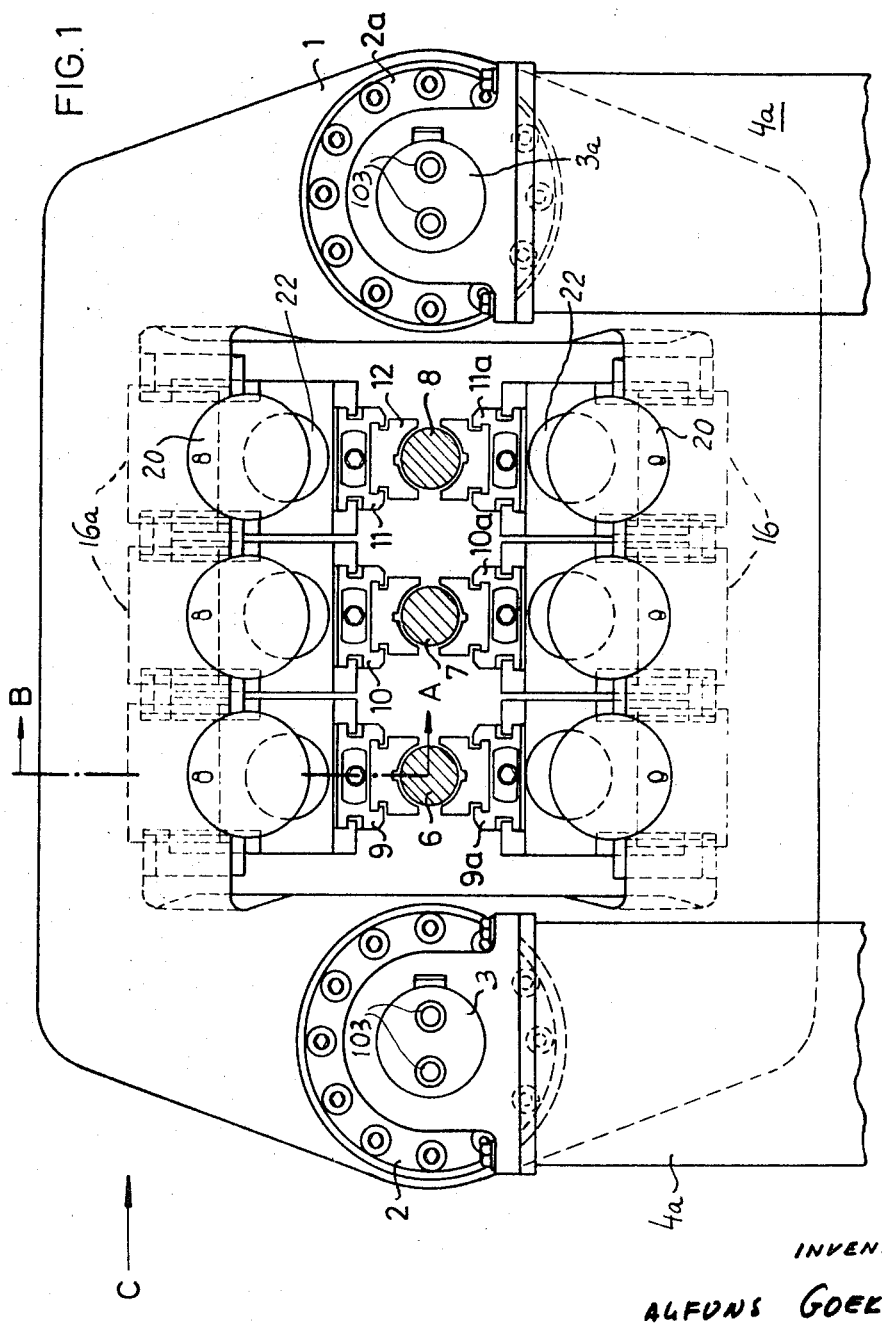
FIG. 1 is an end elevational view of a draw bench having a reciprocable carriage for a clamping apparatus which is constructed in accordance with the present invention and is designed to clamp three tubular or solid rod-shaped workpieces at a time.
Figure 2:
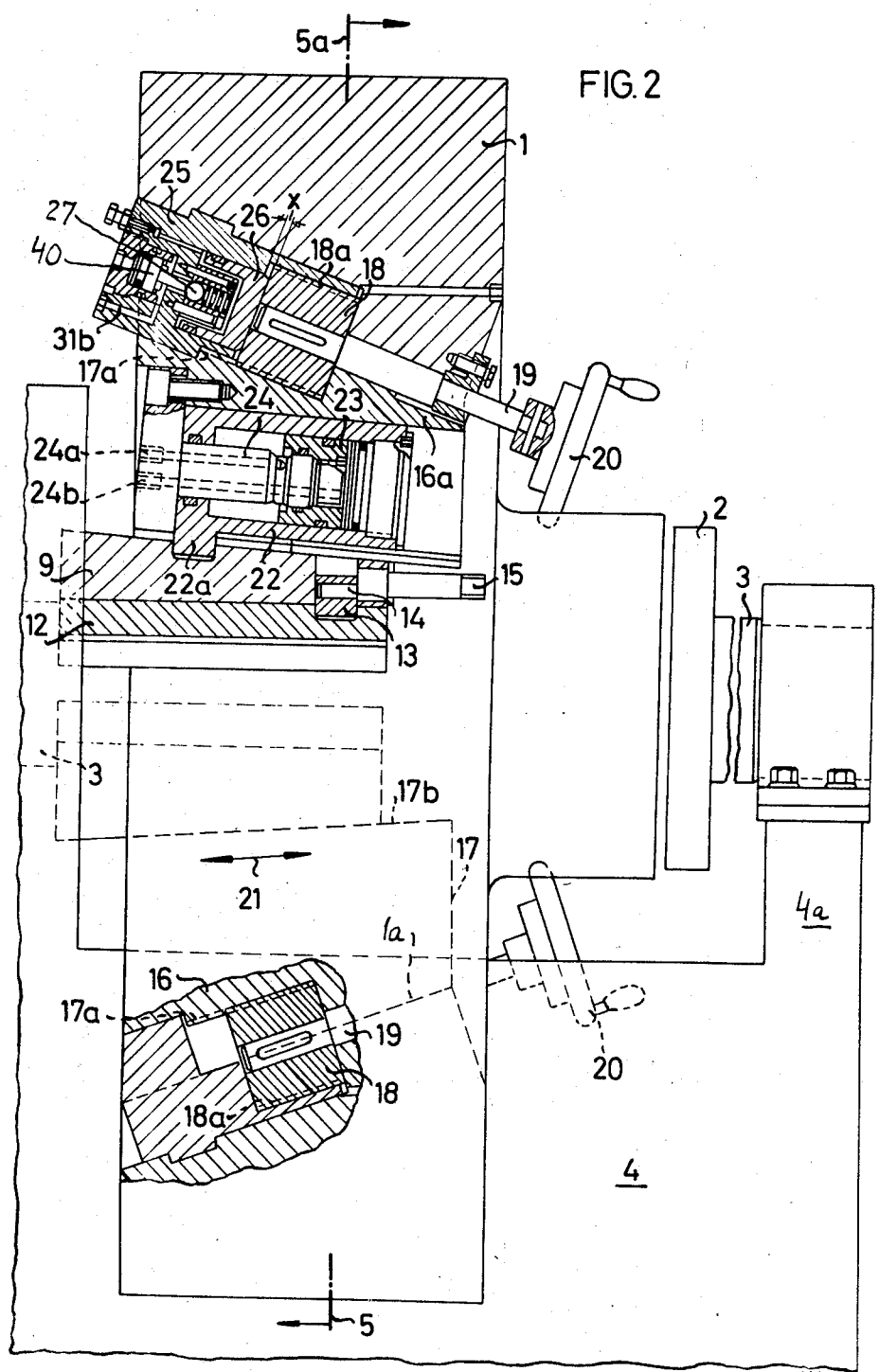
FIG. 2 is an enlarged fragmentary partly side elevational view as seen in the direction of arrow C in FIG. 1 and a partly longitudinal vertical sectional view as seen in the direction of arrows from the line A–B of FIG. 1, with the workpieces omitted.

Referring first to FIGS. 1 and 2, there is shown a portion of a draw bench having a frame 4 with four upright columns 4a (only two shown) which support the end portions of two parallel horizontal piston rods 3, 3a. The pistons (not shown) which are rigid with the piston rods 3 and 3a are received in reciprocable double-acting hydraulic cylinders 2 and 2a which are secured to or made integral with a reciprocable carriage 1. A suitable source of pressurized hydraulic fluid is connected with the chambers of the cylinders 2, 2a by passageways 103 which are machined into the piston rods 3, 3a. The flow of fluid is controlled by valves (not shown) which cause the carriage 1 to move from the right-hand end position shown in FIG. 2 toward a left-hand end position (not shown) and to thereby forcibly advance the leading ends of elongated workpieces 6, 7, 8 into and through suitable dies, not shown. The invention resides in the provision of a novel apparatus which is mounted on and in the carriage 1 and serves to clamp the workpieces 6–8 during movement of the carriage toward its left-hand end position. Certain parts of the clamping apparatus grip the workpieces 6–8 while the carriage 1 advances in the direction indicated by the arrow 5, and such parts are disengaged from the workpieces while the carriage 1 performs a return stroke in the direction indicated by the arrow 5a.

The clamping apparatus comprises pairs of wedge-like holders 9–9a, 10–10a, 11–11a, one pair for each workpiece. Each holder is provided with a horizontal groove for reception of a rail forming part of an elongated clamping element or gripper 12 which is movable into direct clamping engagement with the respective workpiece 6, 7 or 8. Each clamping element 12 has a recess or notch close to one of its ends and the respective holder (see the holder 9 in FIG. 2) is provided with a rotatable locking member 13 fixed to an eccentric pin 14 of a rotatable shaft 15 having an exposed polygonal head which can be engaged by a suitable tool to rotate the shaft 15 between two positions in one of which the locking member 13 extends into the recess of the adjacent clamping element 12 and in the other of which the member 13 is withdrawn from such recess to permit withdrawal of the clamping element 12 from the respective holder. The pairs of clamping elements 12 are disposed mirror symmetrically with reference to the common horizontal plane of the axes of workpieces 6–8.

Each of the holders 9–11a is reciprocable by a double-acting hydraulic cylinder 22 which has a projection 22a extending into a recess or cutout of the respective holder (see the holder 9 shown in FIG. 2). The cylinders 22 accommodate pistons 23 having piston rods 24 which are fixedly connected to wedge-like adjusting members 16a (for the holders 9, 10, 11) and 16 (for the holders 9a, 10a, 11a). The chambers of the cylinders 22 receive pressurized hydraulic fluid by way of passageways 24a, 24b machined into the respective piston rods 24. If the cylinder 22 for the holder 9 shown in FIG. 2 is caused to move in a direction to the right (arrow 5a), an outer guide face of the holder 9 slides along a suitably inclined internal guide face 17b of the respective adjusting member 16a and moves its clamping element 12 radially inwardly toward clamping engagement with the workpiece 6. During such movement of the cylinder 22, the locking member 13 extends into the recess of the respective clamping element 12 to hold it against lengthwise movement with reference to the holder 9. The projection 22a of the cylinder 22 extends into the cutout of the holder 9 so that the latter is compelled to share all reciprocatory movements of the cylinder 22. The inclination of the guide faces 17b on the adjusting members 16, 16a is below a self-locking angle. The guide faces 17a slope toward the plane of the path for the workpieces 6–8 counter to the direction (arrow 5) of forward movement of the carriage 1.

The outline of one of the lower adjusting members 16 is indicated in FIG. 2 by broken lines, as at 17. The means for moving the wedge-like adjusting members 16, 16a with reference to the carriage 1 comprises six spindles 19 which are rotatably mounted in the housing of the carriage 1 and are provided with hand wheels 20. Each spindle 19 is held against axial movement with reference to the carriage 1 and is provided with a feed screw 18 having external threads 18a mating with internal threads 17a of a concave semicylindrical surface of the respective adjusting member 16 or 16a. Thus, when a hand wheel 20 is rotated by the operator, the respective spindle 19 rotates its feed screw 18 whereby the corresponding adjusting member 16 or 16a moves axially and radially of the workpieces 6–8 because each of the members 16, 16a is provided with an inclined outer guide surface slidable along the complementary internal guide surface 1a of the carriage 1. The directions in which a lower adjusting member 16 shown in FIG. 2 is movable in response to rotation of the lower hand wheel 20 in a clockwise or in a counterclockwise direction are indicated by a double-headed arrow 21.

The carriage 1 further supports three single-acting hydraulic cylinders 25 for pistons 26 which serve as abutments for the upper adjusting members 16a during movement of the carriage 1 to its left-hand end position, as viewed in FIG. 2. The pistons 26 then abut against the respective feed screws 18. The hydraulic pressure medium for the cylinders 25 is admitted and evacuated through one-way valves 27 (FIG. 3) which can be opened and closed in dependency on the regulation of fluid flow in the cylinders 22.

Figure 3:
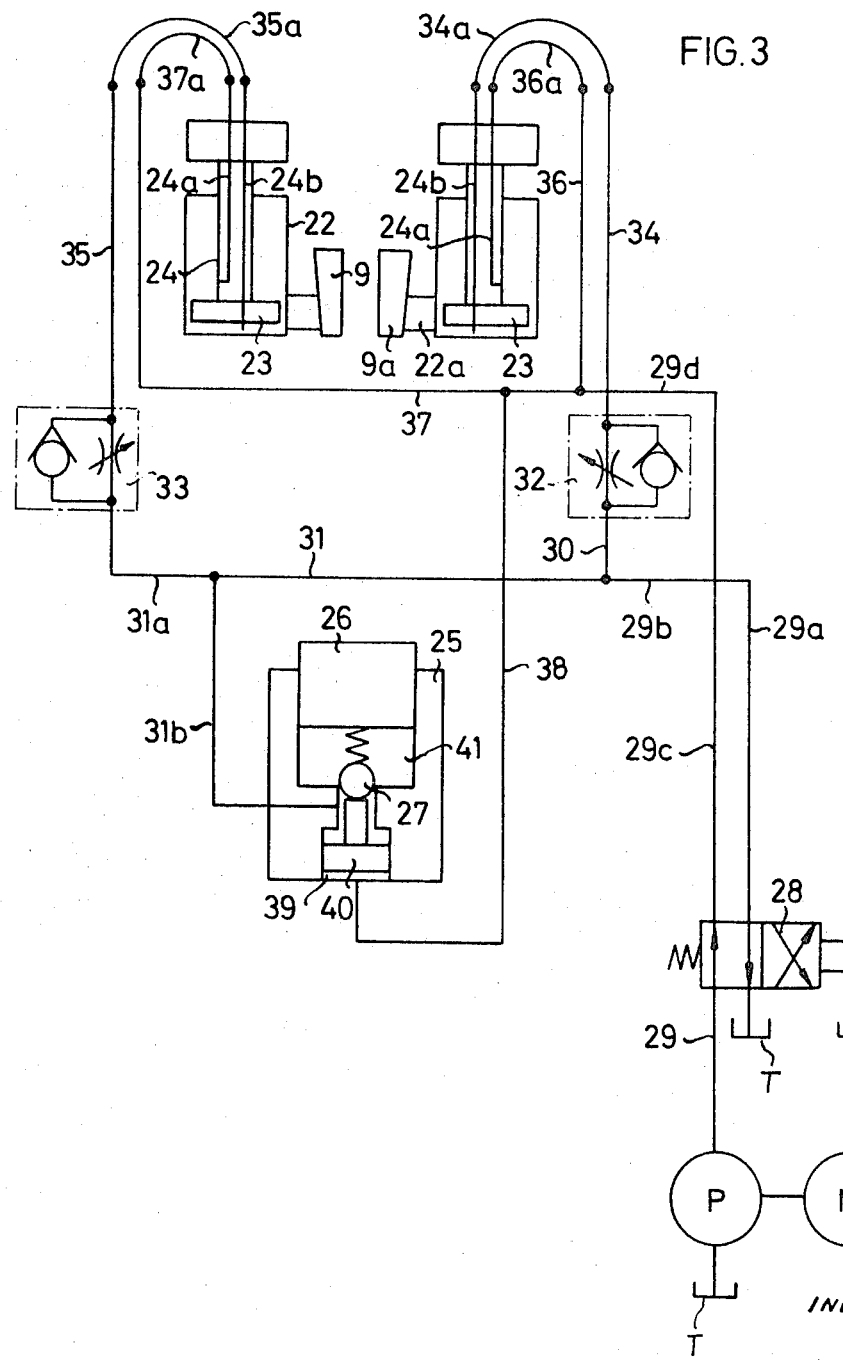
FIG. 3 is a diagram of a portion of the hydraulic circuit for the clamping apparatus.

The operation of the clamping apparatus will be described with reference to FIGS. 1–2 and also with continued reference to FIG. 3 which illustrates the hydraulic circuit for the various cylinders. It is assumed that the members 16, 16a are properly adjusted with reference to the carriage 1 so that the cylinders 22 can move the elements 12 into requisite engagement with the workpieces 6–8. In the first step, a multi-way solenoid-operated valve 28 is set to the position shown in FIG. 3 so that a pump P which is driven by a motor M conveys a pressurized hydraulic fluid through conduits 29, 29a, 29b, 30, 31, 31a, flow regulators 32, 33 and conduits 34, 34a, 35 and 35a into the passageways 24b of the piston rods 24. This causes all of the cylinders 22 and the corresponding holders 9 to 11a to advance in a direction to the right, as viewed in FIG. 2, and to place the respective clamping elements 12 into engagement with the workpieces 6, 7, 8.

At the same time, the pump P conveys pressurized hydraulic fluid (preferably oil) through the conduits 31b (one shown) into the through the one-way valves 27 so that the fluid enters the chambers 41 of the cylinders 25 and presses the pistons 26 against the feed screws 18 of the spindles 19 for the adjusting members 16a. This eliminates play between the threads 18a of the feed screws 18 and the threads 17a of the adjusting members 16a. In the next step, the cylinders 2, 2a receive pressurized fluid to move with the carriage 1 in a direction to the left, as viewed in FIG. 2 (arrow 5), so that the leading ends of the workpieces 6, 7, 8 are caused to pass through the respective dies and into the range of a drawing carriage (not shown) which thereupon carries out the drawing operation by pulling each of the workpieces through the respective die. The cylinders 2 and 2a are large enough to furnish a substantial force which is necessary to cause the leading ends of the workpieces 6, 7, 8 to pass through the respective dies.

As mentioned above, the inclination of the inner faces 17b of the adjusting members 16, 16a is below the self-locking angle. Thus, the holders 9–11a tend to move in a direction to the right, as viewed in FIG. 2, while the carriage 1 propels the leaders of the workpieces through the dies. This produces very substantial clamping forces which prevent excessive slippage of workpieces with reference to the relatively short clamping elements 12. The radial stresses which develop during introduction of workpieces into the dies are taken up by the adjusting members 16, 16a and are transmitted to the carriage 1 whose housing is stressed. Such radial forces have a component acting in the direction to loosen the adjusting members, namely, to move these members in a direction to the left, as viewed in FIG. 2. However, the upper adjusting members 16a are held against such movement by the pistons 26 whereby these pistons not only prevent a loosening of the upper adjusting members 16a but also a loosening of the lower adjusting members 16. The pistons 26 cannot yield because the valves 27 prevent escape of fluid from the chambers 41 of the cylinders 25.

When the carriage 1 has completed its forward stroke (arrow 5), the setting of the valve 28 is changed so that the pump P conveys pressurized fluid from the conduit 29 into the conduits 29c, 29d, 36, 36a, 37 and 37a while the conduit 29a returns fluid into the tank T. The conduits 36a, 37a admit pressurized fluid into the passageways 24a so that the cylinders 22 tend to move in the direction indicated by the arrow 5. Such movement of cylinders 22 is possible only when the fluid pressure upon the pistons 26 is terminated in the following way: The conduit 37 communicates with a conduit 38 which admits pressurized fluid into chambers 39 to lift plungers 40 which can displace the balls of the one-way valves 27. Thus, the fluid can escape from the chambers 41 to permit a downward movement of the pistons 26 as viewed in FIG. 3. The outflowing fluid returns into the tank T by way of the conduits 31b, 31 and 29a.

The stress upon the housing of the carriage 1 is terminated in response to termination of fluid pressure against the pistons 26 because the adjusting members 16a have a limited freedom of movement in a direction to open the clamping apparatus. In the illustrated embodiment, the extent of movement of the upper adjusting members 16a is shown at X; such movement is determined by axial clearance between the feed screws 18 and the cylinders 25. This minimal displacement of the adjusting members 16a suffices to enable the cylinders 22 to move the respective holders 9–11a lengthwise and to disengage the clamping elements 12 from the respective workpieces. The carriage 1 is thereupon moved in the direction indicated by the arrow 5a and returns to the position shown in FIG. 2. The clamping apparatus is ready to engage a second set of workpieces.

The pump P is preferably adjustable so that it can deliver oil or another hydraulic fluid at two or more different pressures.

FIG. 2 shows that the length of the carriage 1 (as considered in the direction of its movement along the piston rods 3 and 3a) need not exceed the length of the clamping elements 12. This is attributable to the fact that the inclination of the guide faces 17b with reference to the path of movement of the workpieces 6–8 is below the self-locking angle. Therefore, relatively short clamping elements can engage the workpieces with a very strong force, and such short clamping elements render it possible to employ a short carriage.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. In a machine for moving elongated workpieces lengthwise along a predetermined path, particularly in a drawing bench, a combination comprising a carriage reciprocable in and counter to a predetermined direction; at least one pair of wedge-like adjusting members mounted in said carriage at the opposite sides of said path and movable with reference to said carriage in and counter to said direction, said carriage having an internal guide surface sloping towards said path counter to said direction, and said adjusting member having complementary surfaces movable along said guide surfaces, the inclination of said surfaces with reference to said path being above a self-locking angle; abutment means provided in said carriage for at least one of said adjusting members, said abutment means extending into the path of movement of said one adjusting member in said direction with reference to said carrier and being movable toward and away from said one adjusting member; and retaining means for holding said abutment means with a variable force in a predetermined position with reference to said carriage.

2. A combination as defined in claim 1, further comprising wedge-like holders, one for each of said adjusting members and each having a guide face sloping toward said path counter to said direction and slidable along a complementary face of the respective adjusting member, the inclination of said faces with reference to said path being less than the inclination of said guide surfaces.

3. A combination as defined in claim 2, further comprising a workpiece-engaging clamping element provided on each of said holders.

4. A combination as defined in claim 2, further comprising double-acting hydraulic cylinder means for moving said holders with reference to the respective adjusting members.

5. A combination as defined in claim 2, further comprising a single-acting cylinder mounted in said carriage, and a piston reciprocably mounted in said cylinder, said piston constituting said abutment means and said cylinder forming part of said retaining means.

6. A combination as defined in claim 5, wherein said retaining means further comprises one-way valve means for admitting into said cylinder a hydraulic fluid which prevents movement of the piston from said predetermined position.

7. A combination as defined in claim 6, further comprising double-acting hydraulic cylinder means for moving said holders with reference to the respective adjusting members, and means for admitting to said single-acting cylinder a hydraulic fluid by way of said one-way valve means in response to such actuation of at least one of said double-acting cylinders that the latter tends to move the respective holder in said direction with reference to the corresponding adjusting member.

8. A combination as defined in claim 1, further comprising means for moving said adjusting members along the guide surfaces of said carriage.

9. A combination as defined in claim 1, wherein said predetermined path is substantially horizontal and further comprising wedge-like holders supported by and movable with reference to said adjusting members along guide faces provided on said adjusting members and sloping toward said predetermined path counter to said direction, each of said holders having a detachable work-engaging clamping element the length of which approximates the length of said carriage, as considered in said direction.

10. A combination as defined in claim 1, wherein said carriage supports several pairs of adjusting members.

* * * * *